F. Y. DIBBLE.
TRIPLE VALVE FOR AIR BRAKE MECHANISM.
APPLICATION FILED APR. 19, 1909.
950,375.
Patented Feb. 22, 1910.
3 SHEETS—SHEET 1.
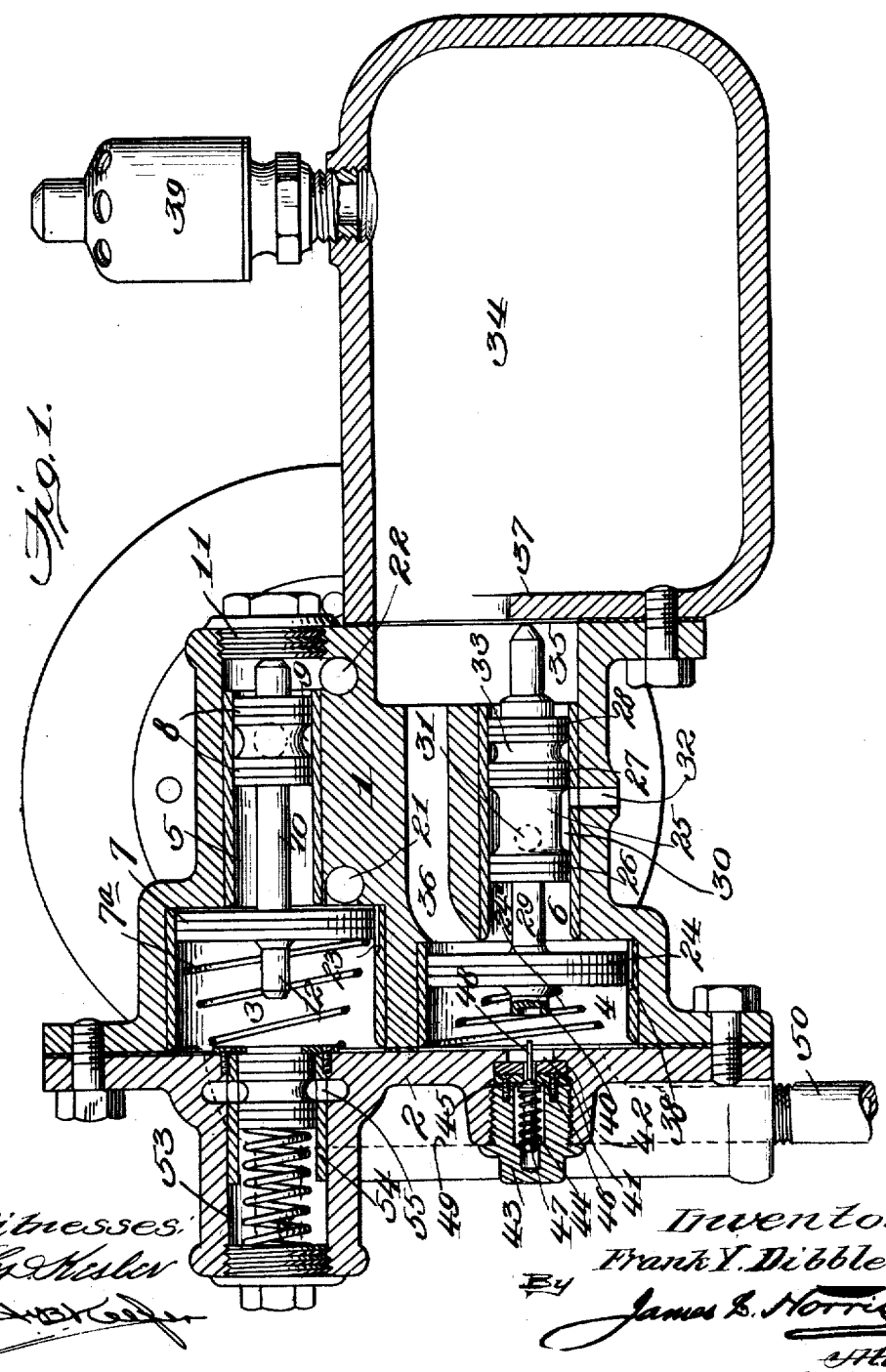

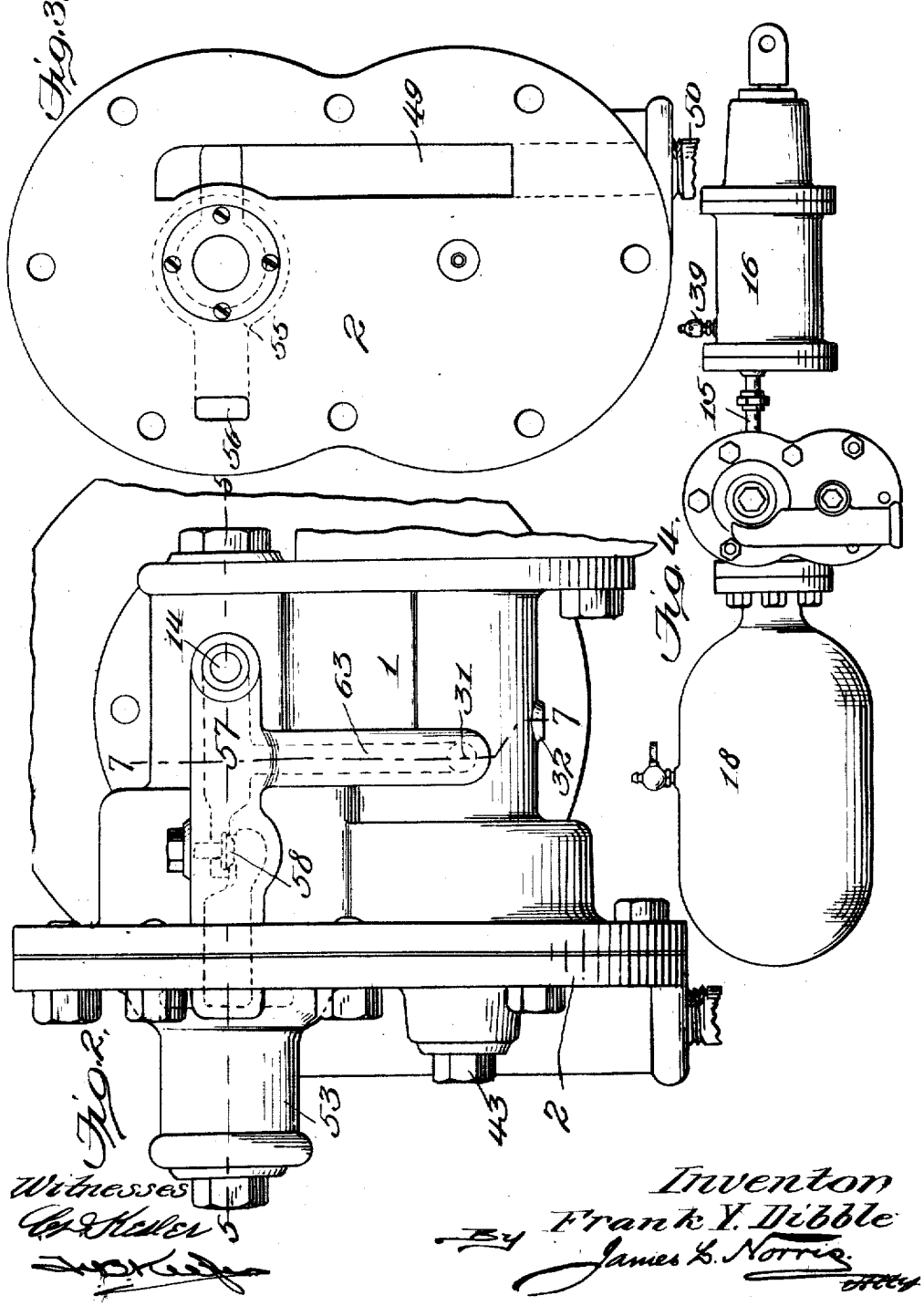

F. Y. DIBBLE.
TRIPLE VALVE FOR AIR BRAKE MECHANISM.
APPLICATION FILED APR. 19, 1909.

950,375.

Patented Feb. 22, 1910.
3 SHEETS—SHEET 3.

Witnesses

Inventor
Frank Y. Dibble
By James L. Norris
Atty.

UNITED STATES PATENT OFFICE.

FRANK Y. DIBBLE, OF ELY, NEVADA, ASSIGNOR OF ONE-THIRD TO GEORGE F. DECKELMAN AND ONE-THIRD TO E. K. HUTCHISON, OF ELY, NEVADA.

TRIPLE VALVE FOR AIR-BRAKE MECHANISM.

950,375.	Specification of Letters Patent.	Patented Feb. 22, 1910.

Application filed April 19, 1909. Serial No. 490,807.

*To all whom it may concern:*

Be it known that I, FRANK Y. DIBBLE, a citizen of the United States, residing at Ely, in the county of White Pine and State of Nevada, have invented new and useful Improvements in Triple Valves for Air-Brake Mechanism, of which the following is a specification.

My present invention relates to improvements in air brake mechanism, and it has for its object primarily to provide a mechanism of this class whereby a recharging of the auxiliary reservoir may take place without releasing the brakes, it being possible therefore to set the brakes and to maintain them in set condition upon a very long grade, and while the brakes remain so set the auxiliary reservoir which feeds the air pressure to the brake cylinder may be recharging so as to compensate for any leakage of air in the system that in the existing forms of brake mechanism permits a releasing of the brakes and thus causes the train to get beyond the control of the engineer.

Another object of the invention is to provide a triple valve for air brake mechanism that is of a novel and improved construction, it embodying essentially two pistons both controllable by the train pipe pressure, one serving to control the admission of the air pressure to the brake cylinder and the other controlling the release of air from the brake cylinder, a releasing reservoir being provided for the latter piston which is also capable of being recharged from the train pipe by means of a novel construction of the triple valve, the triple valve being also equipped with a simple and improved mechanism for producing an emergency application of the brakes, and in general the construction of the triple valve is improved, it being relatively simple and inexpensive in its construction and reliable in its operation and it is capable of use in trains either equipped wholly with triple valves of the present construction or with those either of the Westinghouse or New York types of air brakes.

To these and other ends, the invention consists in certain improvements, and combinations and arrangements of parts, all as will be hereinafter more fully described, the novel features being pointed out particularly in the claims at the end of the specification.

Figure 5:
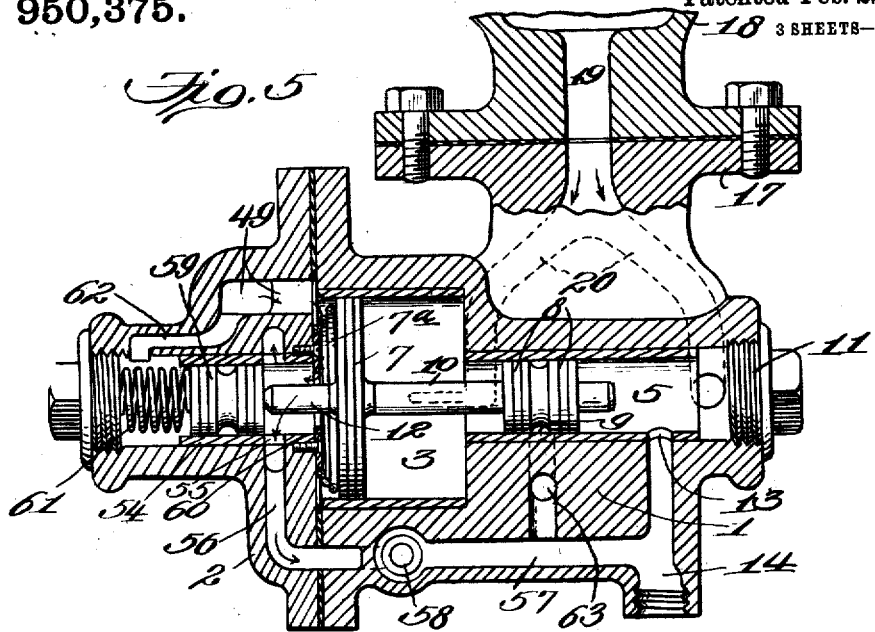
Figure 6:
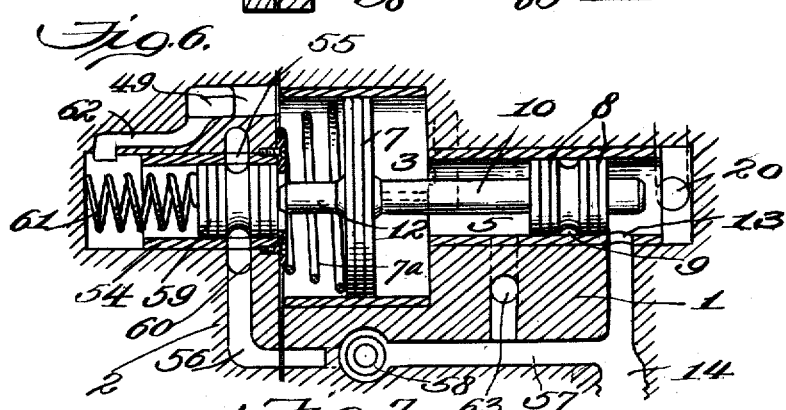
Figure 7:
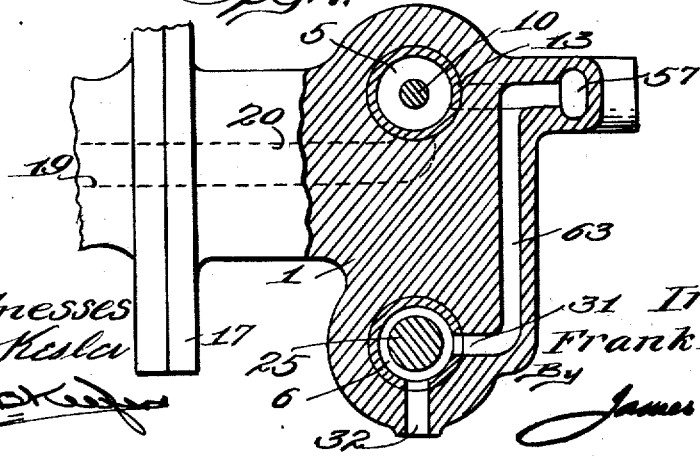

In the accompanying drawings: Figure 1 represents a central vertical section of a triple valve constructed in accordance with my present invention, the parts being shown in normal or running position; Fig. 2 represents a side elevation of the valve, a portion of the auxiliary reservoir being shown in rear of it and the releasing reservoir being broken away; Fig. 3 illustrates the valve as viewed from the left in Fig. 2; Fig. 4 is a detail plan view of the triple valve, the auxiliary reservoir and the brake cylinder showing the manner in which the same are connected for operation; Fig. 5 represents a section through the valve on the line 5—5 of Fig. 2 showing the parts in position for the emergency application of the brakes; Fig. 6 is a diagrammatic view of the same parts shown in Fig. 5, these parts however being in service application position; and Fig. 7 represents a section on the line 7—7 of Fig. 2 although on a smaller scale.

Similar parts are designated by the same reference characters in the several views.

Air brake mechanism constructed in accordance with my present invention is capable of use generally upon trains whether the same be equipped wholly with triple valves embodying the present invention or whether they be equipped wholly or partially with air brake systems of the Westinghouse or New York type.

In the accompanying drawing, I have shown one embodiment of the invention, but it will be understood that the form shown is given as an example, and that certain changes or modifications may be made therein in order to adapt the mechanism for use to the best advantage in each particular case.

In the present instance, the triple valve comprises a casing that is formed in two sections 1 and 2 which are flanged and suitably bolted together. The section 1 is formed with a pair of relatively large piston chambers 3 and 4 which are shown as provided with bushings of suitable metal and also with a pair of relatively smaller piston chambers 5 and 6, these smaller piston chambers being in axial alinement with the corresponding larger chambers 3 and 4 respectively. Within the upper piston chamber 3 is fitted a piston 7 which is freely operable therein owing to variations in pressure at its opposite sides and it is connected to a valve of appropriate form which serves to control the admission of air under pressure from the auxiliary reservoir to the brake cylinder.

In the present instance, I have shown a piston valve comprising a pair of spaced heads 8 provided with appropriate packing rings and the valve between these heads is provided with a circumferential groove 9. The piston valve and its operating piston 7 are connected for simultaneous movement by means of the stem 10, the rear end of the latter being arranged to coöperate with the threaded plug 11 screwed into the back of the piston chamber 5 as an abutment, and the forward end of this stem projects a suitable distance in advance of the operating piston 7 to form a plunger 12 which serves to produce an emergency application of the brakes as will be hereinafter described. The piston chamber 5 is also bushed in the present instance, and a port 13 leads through the bushing and also through the casing of the valve into a passage 14, the latter being connected by a pipe 15 to the brake cylinder 16.

One side of the triple valve is provided preferably with a flange 17 to which is bolted the flanged end of the auxiliary reservoir 18, the air passage 19 of the latter leading into a branched passage 20 in the triple valve casing and these branch passages lead to ports 21 and 22 respectively, the port 21 opening at the rear side of the piston 7 so that the pressure from the auxiliary reservoir will not only act upon the larger piston 7 but will also act upon the adjacent face of the piston valve head 8, while the port 22 opens at the rear end of the piston chamber 5 and acts on the opposite head 8 of the valve therein. The port 13 is opposite to the circumferential groove 9 of the air controlling valve when the latter is in such a position that the stem 10 abuts against the plug 11 at which time the port 22 leading from the auxiliary reservoir is cut off from communication with the brake cylinder. The bushing within which the piston 7 operates is provided at one or more points with a longitudinal groove or leak-passage 23 which is shorter than the stroke of the piston 7 and is so placed that when the piston 7 is in its normal position, air pressure from the chamber 3 may leak through this passage to the rear or opposite side of the piston 7 and may then enter the auxiliary reservoir through the port 21, although when the piston 7 is moved into position to establish communication between the auxiliary reservoir and the brake cylinder, this groove or leak-passage will not permit train pipe pressure to reach the auxiliary reservoir through the port 21. The piston chamber 4 is also preferably lined with an appropriate bushing and it contains a second piston 24 which is freely operable therein and it serves to actuate a valve which controls the releasing of the air pressure from the brake cylinder. In the present instance, I have shown a piston valve 25 which serves this purpose, it having heads 26, 27 and 28 which are suitably packed and have a fluid-tight fit within the piston chamber 6 which is also shown as provided with an appropriate renewable metal lining, and this valve is connected to the piston 24 by a stem 29.

The valve 25 is provided with a circumferential groove or channel 30 which serves to establish communication between a port 31 which leads from the brake cylinder and a vent port 32 which permits the air from the brake cylinder to escape to the atmosphere, this communication being established while the valve 25 is in its normal position as shown in Fig. 1. The valve 25 is also provided with a second circumferential groove or passage 33 which is arranged between the heads 27 and 28 of the valve and this groove is arranged to register with the vent port 32 when the valve 25 is shifted into such a position as to close the vent 32 and thereby maintain the pressure in the brake cylinder to retain the brakes in set condition. A releasing pressure reservoir 34 is provided, that shown in the present instance being bolted by suitable flange connections to one end of the triple valve, and the air pressure within this reservoir communicates through the medium of the chamber 35 with the rear end of the piston or valve chamber 6 while a passage 36 establishes communication between the forward end of the piston or valve chamber 6, the rear side of the piston 24 and the releasing reservoir. When the valve 25 is in a position to close the vent 32 and thereby retain the brakes in set condition, the heads 27 and 28 will be arranged at opposite sides of this vent and will thereby prevent leakage of air from the brake cylinder and releasing reservoir to the atmosphere. Normally, the valve 25 and the piston 24 will occupy the position shown in Fig. 1 at which time the vent 32 will be open and the air in the brake cylinder will stand at atmospheric pressure, and in order to properly position the valve at this point, the rear end of the stem 29 is prolonged and is adapted to coöperate with an abutment 37 which in the present instance is formed as a part of the releasing pressure reservoir.

In order to provide for the recharging of the releasing pressure reservoir, the bushing or lining for the piston chamber 4 is provided with a longitudinal groove or leak-passage 38 which is arranged at its rear end so that when the piston 24 is in normal position or a position in which the valve 25 will vent the air from the brake cylinder, this passage will permit train pipe pressure to escape through it and thus around the piston 24, and this air reaches the releasing pressure reservoir by way of the passage 36. In order to prevent any excess of pressure within the releasing pressure reservoir, a suitable safety valve 39 may be provided as shown.

At the forward side of the piston 24 is provided a cup-shaped head 40 which is adapted to bear against a seat 41 and thus reduce the effective area at the left side of the piston 24 when the piston 24 moves into a position to close communication between the brake cylinder and the atmosphere, this seat being composed of leather or other appropriate material that is capable of insuring a fluid-tight fit between it and the head 40, and this seat in the present instance is confined closely within a recess 42 in the section 2 of the valve casing by means of a plug 43 which may be threaded or otherwise secured in position. In order to prevent train pipe pressure in the chamber 4 from leaking between the head 40 and the seat 41 and thus acting upon the face of the head 40, I provide an automatically-operable device for establishing communication between the interior face of the head 40 and the atmosphere, this device in the present instance consisting of a plunger 44 which is contained within the plug 43 and is provided with a conical valve 45 which is adapted to seat against the outer side of a plate 46 which is secured to the inner end of the plug 43, a spring 47 serving to force the valve 45 upon its seat with a pressure that will be sufficient to withstand the train pipe pressure within the chamber 4, although such spring will yield under the action of the piston 24. The end 48 of the plunger is reduced and extends through the plate 46 and the seat 41, it being of such a length that it will be engaged by the head 40 and thus forced back so as to unseat the valve 45 when the piston 24 moves toward the left in Fig. 1 to prevent the escape of air from the brake cylinder to the atmosphere, the peripheral portion of the head 40 seating against the seat 41 so as to prevent the escape of train pipe pressure from the chamber 4 to the atmosphere although the interior face of the head 40 is open to the atmosphere. Hence, any air that might escape from the chamber 4 between the head 40 and the seat 41 will escape to the atmosphere and it cannot therefore act upon the head 40 so as to enable the train pipe pressure in the chamber 4 to overbalance the pressure in the releasing reservoir 34.

The piston chambers 3 and 4 are constantly in communication with the train pipe, the flanged section 2 of the triple valve casing in the present instance being provided with a passage 49 which is in communication with the train pipe through the pipe 50, and the air under train pipe pressure may flow from this passage 49 into the chambers 3 and 4 respectively.

In order to provide for emergency applications of the brakes, the section 2 of the triple valve casing is provided with a valve chamber 53 which in the present instance is cylindrical as it is preferable to use a piston valve, this chamber being in alinement with the axis of the chamber 3 for the piston 7 and it is provided with a lining or bushing 54, the latter being provided with a plurality of ports 55 that communicate through the passages 56 and 57 with the passage 14 leading to the brake cylinder, a check or non-return valve 58 being interposed between the passages 56 and 57 so as to permit air to pass from the passage 56 into the brake cylinder, but a back flow of air from the brake cylinder is prevented, this check valve 58 being closed during the normal service applications and it opens only during emergency applications. Within the bushing or lining 54 is mounted a piston valve 59 having suitably packed heads at its opposite ends, and an annular plate 60 is secured to the face of the section 2 and serves to limit the movement of this valve toward the piston 7 under the action of a compression spring 61 which acts against the rear side of the valve, the rear side of the valve being constantly subjected to train pipe pressure by reason of its connection by the passage 62 to the passage 49 and in this way the pressure at both sides of the valve 59 is balanced. In the present instance, the passages 56 and 57 are formed by coring suitable bosses that are cast integral with the valve casing, and the two sections of the valve casing, and the port 31 through which air from the brake cylinder is vented is connected to the passage 57 through the medium of a branch passage 63. The brake cylinder is in the present instance shown provided with a small relief or safety valve of any appropriate type and this device may be provided to prevent any excess of pressure in the brake cylinder although, of course, the same may be omitted. The auxiliary reservoir may also be provided with a small hand-operated releasing valve, such a valve being usually provided whereby air may be released from the auxiliary reservoir when desirable.

Triple valves embodying the present invention may be used in trains that are either equipped throughout with such valves or they may be used in trains that are equipped wholly or partially with either the Westinghouse or New York types of air brake. The operation of the valve will be first described in those cases where the train is equipped entirely with triple valves constructed in accordance with the present invention. Assuming that the ordinary engineer's brake valve is used in the locomotive cab, the engineer when he wishes to make a light application of the brake such, for instance, as on a light grade in order to slightly check the speed of the train, places the valve in service position thereby lowering the train pipe pressure from, say, a normal pressure of seventy pounds to sixty-five pounds. The drop in train pipe pressure will correspondingly reduce the pressure of air in the cylinder chambers 3 and 4, thus unbalancing valves 7 and 24 and causing them to move simultaneously toward the left in Fig. 1 until they are arrested by the respective abutting devices, the emergency valve 59 serving as the abutment for the piston 7 as shown in Fig. 6 while the seat 41 coöperating with the head 40 serves as an abutment for the piston 24.

The spring 61 behind the emergency pressure valve is sufficiently strong to withstand the impact of the piston 7 as the latter moves into position for service application of the brakes so that the emergency pressure valve is not moved appreciably from its normal position as shown in Fig. 6. The movement of the piston 24 toward the left interrupts communication between the port 31 leading from the brake cylinder and the vent 32 leading to the atmosphere and hence any air introduced into the brake cylinder is confined therein. The movement of the piston 7 owing to the reduction in the train pipe pressure for the service application of the brakes carries the valve 8 into a position to uncover the port 13 and thereby establish communication between it and the branch passage 22 which leads from the auxiliary reservoir so that the air under pressure from the auxiliary reservoir is fed to the brake cylinder, causing a gentle application of the brakes uniformly on all the cars. Assuming seventy pounds to be the standard pressure used, the air passing from the auxiliary reservoir to the brake cylinder will be initially of seventy pounds pressure, the auxiliary reservoir receiving its pressure from the train pipe. In making this application of the brake, the train pipe pressure has been reduced, say, five pounds so that it will at this time stand at sixty-five pounds pressure. The piston 7 and the valve operable thereby to control the flow of air from the auxiliary reservoir to the brake cylinder will remain in service position until sufficient air has passed from the auxiliary reservoir into the brake cylinder to reduce the pressure in the auxiliary reservoir until it falls slightly below the train pipe pressure in the piston chamber 3. The piston 7 is thereby unbalanced and the excess of pressure in the train pipe over that in the auxiliary reservoir will cause the piston 7 to return to its former or normal position, the valve 8 thereby interrupting communication between the auxiliary reservoir and the brake cylinder. The brakes at this time are set lightly but owing to leakages in the various parts of the equipment, the pressure in the brake cylinders gradually falls and obviously after reaching a given point the effective action of the brakes is lost in the ordinary equipments, owing to the limited charge of air in the auxiliary reservoir. In the present instance, however, the returning of the piston 7 to the right in Fig. 1 uncovers the groove or leak-passage 23, thereby establishing communication between the train pipe pressure contained in chamber 3 with the auxiliary reservoir through the branch passage or port 21 and, in this manner, air is fed from the train pipe into the auxiliary reservoir to recharge it, the recharging of the auxiliary reservoir continuing until its pressure is, say, sixty-five pounds, that is, it is of the same pressure as the air in the train pipe. During the recharging of the auxiliary reservoir, the air is confined in the brake cylinder, the piston 24 and consequently the valve 25 at this time being in the left hand position and retained in such position by means of the air pressure within the releasing reservoir 34, the packed heads 27 and 28 of the valve 25 at this time resting at opposite sides of the vent 32 so that the air in the brake cylinder cannot escape to the atmosphere, the releasing reservoir 34 being charged with air from the train pipe while the pressure in the train pipe is normal, that is, say seventy pounds, the charging of this releasing reservoir being effected through the leak-passage 38 formed in the wall of the chamber 4 while the piston 24 is in normal running position. While the brakes thus remain set, the engineer may replace his brake valve to running position and thereby recharge the train pipe to the normal pressure of seventy pounds and by so doing, the auxiliary reservoir will obviously be recharged up to seventy pounds pressure and the next application of the brakes will be effected by air leaving the auxiliary reservoir at seventy pounds pressure. Or, if desired, several applications of air from the auxiliary reservoir at sixty-five pounds may be made to compensate for leakages in the equipment that would tend to release the brakes, and in either case, the auxiliary reservoir is recharged with air from the train pipe and the valve 25 maintains the vent for the brake cylinder closed so that the brakes are not released.

In order to avoid increasing the pressure in the brake cylinder to a point that would cause sliding of the wheels, the rear end of the brake cylinder may be equipped with a relief valve so that the pressure in the brake cylinder cannot exceed a given point.

If so desired or necessary, springs 7ª and 24ª may be arranged to act on the pistons 7 and 24 respectively, to prevent their jarring from releasing position.

In order to release the brakes, it is only necessary to replace the engineer's brake valve to full released position, air being thereby fed from the main reservoir which usually varies between 110 and 125 pounds pressure into the train pipe, the pressure in the latter being increased, say, to seventy-five pounds which acting within the chamber 4 will immediately restore the piston 24 and also the valve 25 operated thereby to normal position, that is, to the right in Fig. 1 thereby fully opening the vent 32 and permitting the air in the brake cylinder to escape to the atmosphere and thus release the brakes.

In making an emergency application of the brakes, the engineer's brake valve is set in emergency position, thereby causing a reduction of, say, twenty pounds in the train pipe. The piston 7 owing to the excess of pressure in the auxiliary reservoir over that in the train pipe will be thrown toward the left very quickly, the plunger 12 thereon striking the emergency pressure valve 59 with sufficient impact to drive it rearwardly against its spring 61 and thereby uncover the annular row of ports 55. Communication is thereby established from the passage 51 leading from the train pipe through the chamber 3 and the large area opening provided by the ports 55, a large volume of air thus passing through the passage 56, through the check-valve 58 which is opened at this time, and through the passage 57 into the passage 14 which leads directly to the brake cylinder and, of course, at the same time the air from the auxiliary reservoir is also being fed into the brake cylinder through the port 13, and the large volume of air suddenly entering the brake cylinder will instantly increase the pressure therein to such a point as to effect a quick setting of the brakes with their full braking power. The restoring of the air in the train pipe to normal pressure will obviously restore the large pistons, thereby cutting off the further supply of air to the brake cylinder and permitting the air contained in the brake cylinder to escape, the emergency pressure valve being automatically returned to normal position by its spring.

In using the present triple valve in a train equipped with either the Westinghouse or New York types of air brakes, all of the brakes will be set at the same time and to the same degree at each application until the air in the train pipe falls below a predetermined pressure. In using the Westinghouse and New York types of air brakes, it is necessary to release the brakes in order to recharge the auxiliary reservoirs for those systems, but if the train pipe pressure is restored to a pressure of seventy pounds or under, the present valve would retain the brakes in set condition. However, should the train pipe pressure be raised above the normal pressure of seventy pounds, all brakes would be released and all of the auxiliary reservoirs would be recharged at the same time.

The present invention provides a triple valve that is simple and inexpensive in its construction and which in practice is certain and reliable in its operation, it providing simple and effective means for automatically recharging the auxiliary reservoir from the train pipe while the brakes remain set, so that there is no danger of a train running beyond the control of the engineer as sometimes happens with equipment using either of the two well-known triple valves, wherein a recharging of the auxiliary reservoir cannot be had without permitting a release of the brakes.

The simplicity of the present triple valve is a material advantage, for not only is the cost of the valve lessened, but certainty of operation is insured, one piston serving to control the supply of air from the auxiliary reservoir to the brake cylinder, and a second piston controlling the release of air from the brake cylinder, the former piston also serving to operate the emergency pressure valve. An improved emergency pressure valve is also provided by the present invention whereby ports of large aggregate area are opened so that all available air both from the train pipe and the auxiliary reservoir is fed suddenly and at full pressure into the brake cylinder to effect an almost instantaneous application of the brakes at full power.

What I claim is:—

1. A triple valve for air brake systems embodying a piston subject to train pipe pressure at one side and to auxiliary reservoir pressure at its opposite side, a valve operable by said piston for controlling the air feed from the auxiliary reservoir to the brake cylinder, a releasing valve for controlling the venting of air from the brake cylinder and means controllable by said piston for recharging the auxiliary reservoir with air from the train pipe while said releasing valve is in a position to prevent the venting of air from the brake cylinder.

2. A triple valve involving a piston controllable by the train pipe pressure and subject to auxiliary reservoir pressure, a valve operable by said piston for controlling the air feed from the auxiliary reservoir to the brake cylinder, a releasing valve for controlling the venting of air from the brake cylinder and means for causing a recharging of the auxiliary reservoir with train pipe pressure drawn from one side of said piston while said releasing valve occupies a position to prevent venting of air from the brake cylinder.

3. A triple valve involving a piston subject to train pipe pressure at one side and to auxiliary reservoir pressure at its opposite side, a valve operable by said piston for controlling the air feed from the auxiliary reservoir to the brake cylinder, and means for controlling the venting of air from the brake cylinder, a passage leading from one side of said piston to the opposite side when said means prevents venting of air from the brake cylinder and serving as means for recharging the auxiliary reservoir with train pipe pressure.

4. A triple valve comprising a valve casing having a piston chamber adapted to communicate at one end with a train pipe and at its opposite end with an auxiliary reservoir, a piston operable in said chamber, a valve operable by said piston for controlling the air feed between the auxiliary reservoir and brake cylinder, a releasing valve controlling the venting of air from the brake cylinder, a passage being formed in the wall of the piston chamber and being uncovered or opened by said piston while the releasing valve occupies a position to prevent venting of air from the brake cylinder, thereby causing a recharging of the auxiliary reservoir with air from the train pipe.

5. A triple valve involving a casing having a piston chamber therein, a wall of said chamber toward one end being provided with a leak-passage, one end of said chamber being adapted to communicate with the train pipe and at its opposite end with the auxiliary reservoir, a piston operable in said chamber and adapted to uncover the leak-passage when said piston occupies a predetermined position, a valve operable by said piston for controlling the flow of air from the auxiliary reservoir to the brake cylinder and means for preventing a venting of air from the brake cylinder while said leak passage is uncovered by said piston.

6. A triple valve comprising a casing provided with a piston chamber one end of which is adapted to communicate with the train pipe and the opposite end with the auxiliary reservoir, a piston operable in said chamber and acted upon at its opposite sides by train pipe and auxiliary reservoir pressures respectively, a valve operable by said piston for controlling communication between the auxiliary reservoir and the brake cylinder, a recharging passage being formed in one wall of the piston chamber which passage is open to admit train pipe pressure past said piston and into the auxiliary reservoir while the valve is in a position to close communication between the auxiliary reservoir and the brake cylinder and a releasing valve operative to prevent venting of air from the brake cylinder while said recharging passage is open.

7. A triple valve comprising a casing having a pair of piston chambers therein, both chambers being adapted to communicate at one end with the train pipe, pistons operable in the respective chambers, one of said pistons being subject to auxiliary reservoir pressure and carrying a valve for controlling communication between the auxiliary reservoir and the brake cylinder, a valve being operable by the other piston and serving to control the release of air from the brake cylinder, and means controllable by the piston which operates the valve to control communication between the auxiliary reservoir and the brake cylinder for recharging the auxiliary reservoir with train pipe pressure.

8. The combination of a brake cylinder, an auxiliary reservoir and a triple valve for controlling the operation of the brake cylinder comprising a casing provided with a pair of piston chambers having means for maintaining communication between them and the train pipe, an air feeding valve for controlling the flow of air from the auxiliary reservoir to the brake cylinder, a piston operable in one of the piston chambers connected to actuate the air feeding valve, said piston being subject to the auxiliary reservoir pressure, an air releasing valve operable to vent the air from the brake cylinder, a second piston mounted in the respective piston chamber and connected to actuate the releasing valve, the wall of the piston chamber for the piston which actuates the air feeding valve being provided with a leak-passage through which air from the train pipe may recharge the auxiliary reservoir while the air feeding valve is in closed position, and the wall of the piston chamber for the piston which operates the releasing valve being provided also with a passage to permit train pipe pressure to pass said piston, and a releasing reservoir connected to be recharged with train pipe pressure through the passage last named, the pressure within the releasing reservoir acting upon the piston for the releasing valve.

9. A triple valve comprising a casing having therein an air feeding valve for the brake cylinder, an air releasing valve for the brake cylinder, a piston for actuating the releasing valve, one side of said piston being subject to train pipe pressure, a head carried by said piston, a seat arranged to coöperate with said head as an abutment when said piston moves under the influence of a reduction in the train pipe pressure, and a valve adapted to be unseated by said head and serving to establish communication between the face of said head and the atmosphere.

10. In a triple valve, the combination of a casing, a piston operable therein, a valve operable with said piston for controlling the feed of air from the auxiliary reservoir to the brake cylinder to effect service application of the brakes, and an emergency pressure piston valve for establishing communication between the train pipe and the brake cylinder through a plurality of radial ports formed in the valve casing and operable by the piston for the air feeding valve.

11. In a triple valve, the combination of a casing having a piston chamber therein and also an annular chamber adjacent to and in alinement with the piston chamber, a piston operable in the piston chamber, an air feeding valve operable by said piston, an emergency pressure valve mounted in said annular chamber, the wall of the latter being provided with a plurality of circumferentially spaced ports communicating with a passage leading to the brake cylinder, a spring for normally retaining the emergency pressure valve in inoperative position, both sides of said emergency pressure valve being subject to train pipe pressure, and a part carried by said piston and coöperative with the emergency pressure valve to open the latter upon a predetermined fall of train pipe pressure.

In testimony whereof I have hereunto set my hand in presence of two subscribing witnesses.

FRANK Y. DIBBLE.

Witnesses:
F. E. LASHELLE,
ZELLA DODDS.